United States Patent [19]

Braude

[11] Patent Number: 4,578,619

[45] Date of Patent: Mar. 25, 1986

[54] GLASS COMPOSITION AND GAS-FILLED DISPLAY PANEL INCORPORATING THE GLASS

[75] Inventor: Ruvim Braude, Elizabeth, N.J.

[73] Assignee: Burroughs Corporation, Detroit, Mich.

[21] Appl. No.: 506,841

[22] Filed: Jun. 22, 1983

[51] Int. Cl.$^4$ ............................................. H01J 17/49
[52] U.S. Cl. .................................... 313/586; 313/636; 313/493; 313/480; 313/586; 501/76
[58] Field of Search ...................... 501/76, 77, 78, 79, 501/74; 340/716, 714, 769; 313/586, 636, 493, 480, 586

[56] References Cited

U.S. PATENT DOCUMENTS

| | | | |
|---|---|---|---|
| 3,528,863 | 9/1970 | Foster et al. | 501/76 |
| 3,950,174 | 5/1976 | Suzuki | 501/76 |
| 4,386,348 | 5/1983 | Holz | 340/716 |
| 4,435,511 | 3/1984 | Weaver | 501/76 |
| 4,451,761 | 5/1984 | Kay | 501/76 |

FOREIGN PATENT DOCUMENTS

| | | | |
|---|---|---|---|
| 2823904 | 3/1979 | Fed. Rep. of Germany | 501/76 |
| 0133218 | 11/1978 | Japan | 501/76 |
| 1429392 | 3/1976 | United Kingdom | 501/76 |
| 0564277 | 7/1977 | U.S.S.R. | 501/76 |

*Primary Examiner*—Jeanette M. Hunter
*Attorney, Agent, or Firm*—Robert A. Green; Kevin R. Peterson; Mark T. Starr

[57] ABSTRACT

The disclosure is of a lead-free glass composition including $SiO_2$, $B_2O_3$, $ZnO$, $Al_2O_3$, $Na_2O$, $K_2O$, $CaO$, and $Li_2O$. The glass is used as a cement frit and as an insulating layer in gas-filled display panels including an electrode which is insulated from the gas therein.

3 Claims, 2 Drawing Figures

GLASS COMPOSITION AND GAS-FILLED DISPLAY PANEL INCORPORATING THE GLASS

BACKGROUND OF THE INVENTION

Gas-filled display devices have come into wide use, and these devices are generally of three types, D.C. devices, A.C. devices, and quasi A.C. devices. In D.C. devices, the panel electrodes are disposed within the gas filling of the panel; in A.C. devices, all of the electrodes are insulated from the gas filling by a glass coating; and, in quasi A.C. devices, there is a combination of electrodes, both in contact with and insulated from the gas filling by means of a glass coating formed thereon. When devices of the A.C. and quasi A.C. types are engineered, various factors including the various thermal coefficients of expansion must be taken into account, and, in selecting glasses for coatings, factors to consider are the thermal coefficient of expansion, light transmissivity, and softening temperature.

Up to the present time, glasses suitable for use in various types of display panels have all included lead. As is well known, lead is an undesirable element to have present in the manufacturing process. These lead glasses are readily degraded by thermal processing during fabrication operations and by high electric fields such as those encountered during device operation. In addition, the use of lead-bearing glasses presents a potential environmental and personnel health problem, and this requires complex and expensive protective measures to alleviate.

The present invention provides a new lead-free glass composition which is usable in display panels and the like devices.

DESCRIPTION OF THE INVENTION

Figure 1:
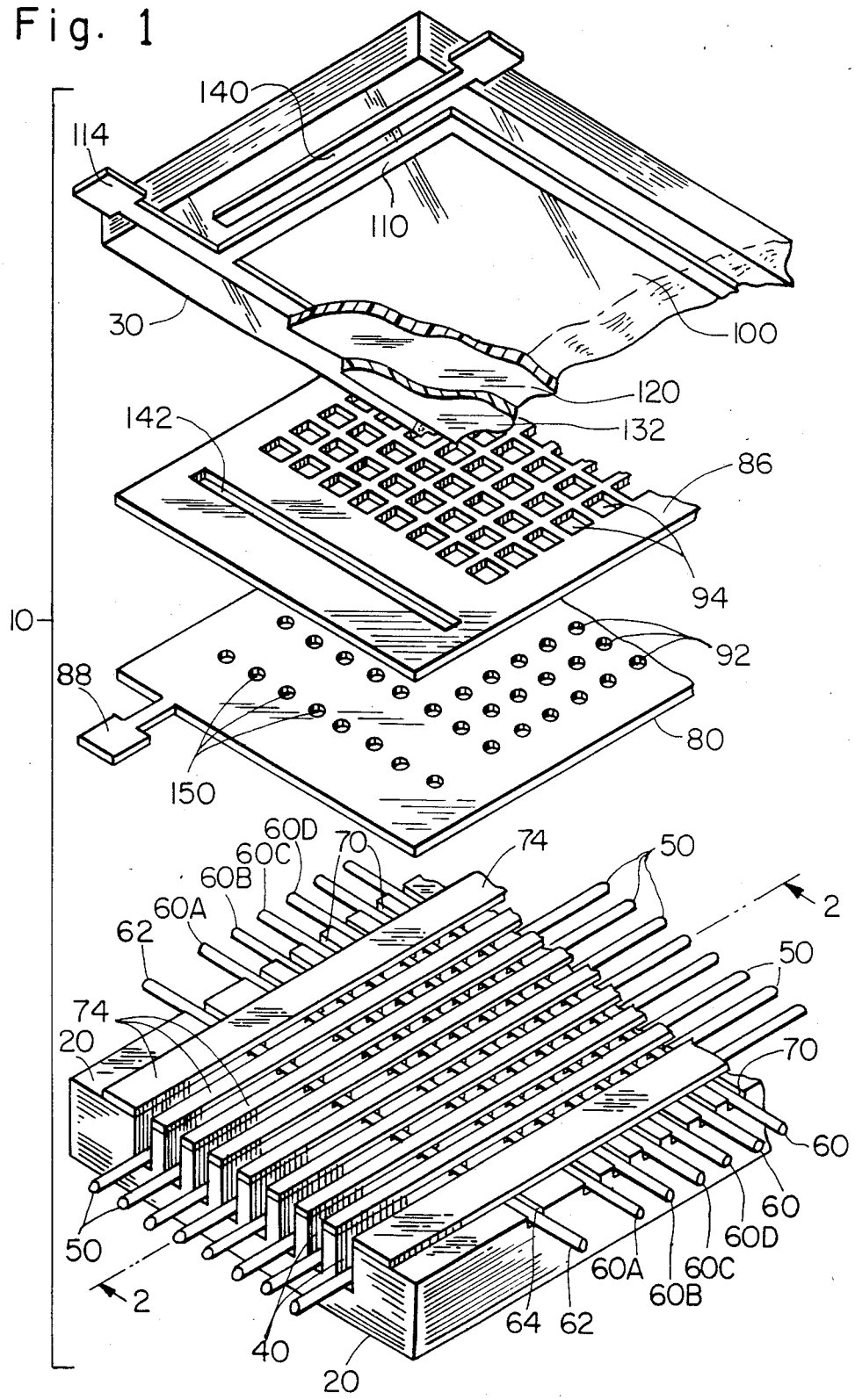
FIG. 1 is a perspective exploded view of a display panel which uses the glass of the invention.

One type of display panel 10 in which a glass composition embodying the invention may be used is described in application Ser. No. 051,313 of George E. Holz and James A. Ogle. This panel includes a gasfilled envelope made up of an insulating base plate 20 and a glass face plate 30, which is shown tilted up in FIG. 1 to present a view of its inner surface. These plates, which are usually of soda-lime glass, are hermetically sealed together along their aligned perimeters to form the panel envelope which encloses the various gas-filled cells and operating electrodes of the panel. The base plate has a top surface 22 in which a plurality of relatively deep parallel slots 40 are formed and in each of which a scan anode electrode 50 is seated and secured.

The anodes 50 are secured in the slots 40 by means of a layer of glass 52 in the bottom of each slot, this glass layer being made up of the glass of the invention which is described below.

Figure 2:
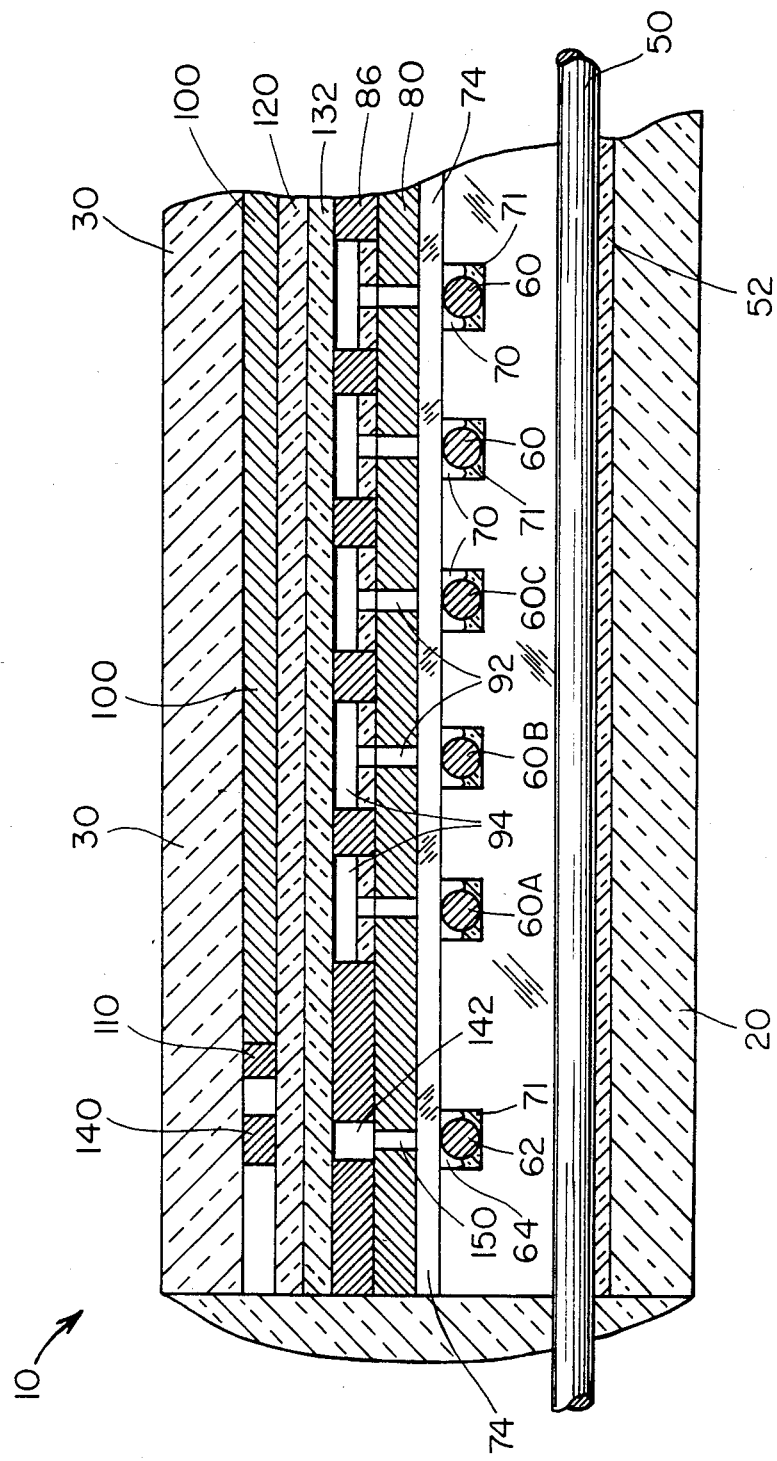
FIG. 2 is a sectional view through the panel of FIG. 1, along lines 2—2, with the panel shown assembled.

A plurality of scan cathode electrodes 60 in the form of wires or strips are seated in relatively shallow slots 70 in the top surface 22 of the base plate and are secured therein by means of a layer of glass 72 which is also the glass of the invention. The scan cathodes 60 are disposed transverse to the scan anodes 50, and each crossing of a scan cathode 60 and a scan anode 50 defines a scanning cell 72 (FIG. 2). It can be seen that the anodes 50 and cathodes 60 form scanning cells which are arrayed in rows and columns.

The scan cathodes 60A, B, C, etc., form a series of cathodes which are energized sequentially in a scanning cycle, with cathode 60A being the first cathode energized in the scanning cycle.

A reset cathode 62 is secured by the glass of the invention in a slot 64 in the top surface of the base plate adjacent to the first scan cathode 60A. Where the reset cathode crosses each scan anode 50, a column of reset cells is formed. These reset cells are turned on or energized at the beginning of each scanning cycle, and they generate excited particles which expedite the turn-on of the first column of scanning cells associated with cathode 60A.

In the panel 10, spacer means comprising strips 74 of insulating material, such as glass, is provided on the top surface of the base plate 20 and on cathodes 60 and 62 so that the cathodes are spaced uniformly from an electrode plate 80 disposed above them, as described below. The strips 74 are disposed across the cathodes 60 which are thus separated into discrete operating portions.

Adjacent to the base plate assembly described above, is a quasi A.C. assembly which includes the electrode 80 which is in the form of a thin metal plate having an array of rows and columns of relatively small apertures 92, each overlying one of the scanning cells. The plate 80 is known as a priming plate and is seated on the insulating layer made up of strips 74. Adjacent to plate 80, and preferably in contact with the upper surface thereof, is an apertured plate 86, known as a glow isolator plate, having rows and columns of apertures 94 which are larger than apertures 92. The apertures 94 comprise the display cells of panel 10. The plate 86 may be of insulating material, or it may be of metal. Plate 80 is provided with a conductive tab 88, to which external contact can be made.

The quasi A.C. assembly also includes a face plate assembly which comprises a large-area transparent electrode 100 on the inner surface of plate 30. A narrow conductor 110 outlines and reinforces the electrode layer 100 and serves to increase its conductivity. The conductor 110 includes a conductive tab 114, to which external connection can be made. An insulating transparent coating 120 of a vitreous glass embodying the invention covers electrode 100, and, if desired, a dielectric layer 132 of magnesium oxide, thorium oxide, or the like is provided on glass layer 120.

The panel 10 includes a keep-alive mechanism comprising an A.C. electrode 140 on the inner surface of the face plate and aligned with a slot 142 in plate 86 and with apertures 150 in plate 80. The keep-alive action is provided by electrode 140 and electrode plate 80.

The gas filling in panel 10 is preferably a Penning gas mixture of, for example, neon and a small percentage of xenon, at a pressure of about 400 Torr.

According to the invention, the composition of the glass of the invention in layer 120, and elsewhere, has a thermal coefficient of expansion which closely matches that of soda-lime glass and possesses a typical dielectric constant of 12. This material is also optically clear when fired on a soda-lime glass base plate. In addition to the abovementioned characteristics, the glass can withstand sealing temperatures up to 490° C. without significant softening and can be fired up to about 600° C. without distortion of the soda-lime base plate.

The glass of the invention includes the following components in the quantities indicated:

| Component | Weight Percent Optimum | Usable Range Variation |
|---|---|---|
| $SiO_2$ | 20 | ±6 |
| ZnO | 40 | ±6 |
| $B_2O_3$ | 20 | ±5 |
| $Al_2O_3$ | 5 | 1–6 |
| $Na_2O$ | 7 | 2–10 |
| $K_2O$ | 4 | 0–6 |
| CaO | 3 | 1–5 |
| $Li_2O$ | 1 | 0–2 |

In preparing the glass, the various components are melted in a platinum crucible furnace at a temperature of about 1000° C. and maintained at that temperature for approximately four hours. It is noted that the $Na_2O$, $K_2O$, and $Li_2O$ are provided in the initial mixture as carbonates, and all other components are provided as normal oxides.

In this glass composition, the $SiO_2$, ZnO, and $B_2O_3$ are the basic elements forming glass. The other components are modifiers.

Although the composition shown above is most suitable for the described application, the variations shown also provide a useful glass. For other applications, other variations in composition may be useful and must be considered within the scope of the invention.

For fabricating the device shown, the glass is incorporated into a paste and subsequently applied by thick film screen printing, doctor blading, or by any other suitable application methods. The paste is prepared by blending the finely ground glass of this invention into a suitable vehicle system. This paste composition can be optimized for a specific application method by utilizing formulation techniques and materials which are well known throughout the thick film ink manufacturing industry.

It should be noted that this glass can also be utilized in various forms such as sheets, rods, or preforms as required for other application requirements.

The glass of the invention has the advantage that, even though it is lead-free, a uniform glass coating which possesses all the optical, mechanical and electrical characteristics required for the described display panel can be formed at temperatures below 560° C. It also shows no adverse reaction with any of the components of panel 10 or any of the processing procedures normally employed in the preparation of a gas-filled display panel.

It is noted that the glass composition of the invention can be used for other applications and in other devices than the display panel described above.

What is claimed is:

1. A glass composition suitable for joining components of apparatus consisting essentially of about 20% by weight of $SiO_2$, about 20% by weight of $B_2O_3$, about 3% by weight of CaO, about 40% by weight of ZnO, about 5% by weight of $Al_2O_3$, about 7% by weight of $Na_2O$, about 4% by weight of $K_2O$, and about 1% by weight of $Li_2O$.

2. A glass composition suitable for joining components of apparatus consisting essentially of 20% by weight of $SiO_2$ with a permissible variation of ±6%; 40% by weight of ZnO with a permissible variation of ±6%; 20% by weight of $B_2O_3$ with a permissible variation of ±5%; 5% by weight of $Al_2O_3$ with a permissible variation of 1% to 6$; 7% by weight of $Na_2O$ with a permissible variation of 2% to 10%; 4% by weight of $K_2O$ with a permissible variation of 0% to 6%; 3% by weight of CaO with a permissible variation of 1% to 5%; and 1% by weight of $Li_2O$ with a permissible variation of 0% to 2%.

3. A gas-filled display panel including
an envelope made up of a base plate and a face plate containing an ionizable gas,
a plurality of D.C. cells, each including a quantity of the gas filling of the panel, and
a large-area electrode on said face plate and insulated from the gas filling of the panel by a layer of glass having a composition including $SiO_2$, $B_2O_3$, ZnO, $Al_2O_3$, $Na_2O$, $K_2O$, CaO, and $Li_2O$, wherein said glass composition consists essentially of about 20% by weight of $SiO_2$, about 20% by weight of $B_2O_3$, about 3% by weight of CaO, about 40% by weight of ZnO, about 5% by weight of $Al_2O_3$, about 7% by weight $Na_2O$, about 4% by weight $K_2O$ and 1% by weight of $Li_{20}$.

* * * * *